United States Patent [19]
Treichel

[11] 3,744,048
[45] July 3, 1973

[54] DISPLAY APPARATUS EMPLOYING FIBER OPTICS

[75] Inventor: Hans H. Treichel, Philadelphia, Pa.

[73] Assignee: Ultronic Systems Corp., Moorestown, N.J.

[22] Filed: Sept. 1, 1971

[21] Appl. No.: 176,858

[52] U.S. Cl.............. 340/324 R, 340/336, 340/380, 350/96 R
[51] Int. Cl. ............................................ G08b 5/36
[58] Field of Search.................... 340/380, 339, 336, 340/324 R; 178/30, DIG. 2; 350/96 R

[56] References Cited
UNITED STATES PATENTS

| | | | |
|---|---|---|---|
| 3,458,655 | 7/1969 | Thourson | 178/30 |
| 2,507,909 | 5/1950 | Kaysen | 340/380 X |
| 2,762,994 | 9/1956 | Kennelly | 340/50 |
| 3,388,292 | 6/1968 | Burns | 340/324 M X |
| 3,539,777 | 11/1970 | Rohland | 340/380 X |
| 2,227,861 | 1/1941 | Petrone | 340/380 X |
| 2,745,092 | 5/1956 | Moorhead et al. | 340/380 X |
| 3,573,785 | 4/1971 | Miller et al. | 178/30 X |

Primary Examiner—David L. Trafton
Attorney—Elmer J. Nealon and Robert T. Orner

[57] ABSTRACT

A fiber optic display employs a rotating drum having on the periphery thereof a plurality of light sources arranged along a line parallel to the axis of rotation. A row and column array of fiber optic members has one end terminating on a cylindrical surface and the other end terminating at a display surface. As the drum rotates with respect to the cylindrical surface, the line of light sources sequentially couples light on a column by column basis to the end of the fiber optic array associated with the cylindrical surface. By selectively energizing the light sources in synchronism with the rotation of the drum, alphanumeric characters are formed on the display surface.

7 Claims, 3 Drawing Figures

| SLIP RING | SIGNAL |
|---|---|
| 23-1 |  |
| 23-2 |  |
| 23-3 |  |
| 23-4 |  |
| 23-5 |  |
| 23-6 |  |
| 23-7 |  |
| 23-8 |  |
| DRUM POSITION |  |

INVENTOR.
HANS H. TREICHEL
BY
ATTORNEY

DISPLAY APPARATUS EMPLOYING FIBER OPTICS

BACKGROUND OF THE INVENTION

This invention relates to display systems, in particular to display systems employing fiber optics.

Display systems presently employed include the cathode ray tube (CRT) type which requires high voltage and complicated conditioning circuitry to provide a display media. Other display systems include plasma display devices which also have high voltage requirements and lamp matrix type displays which employ a plurality of individual lamps as a display surface.

SUMMARY OF THE INVENTION

A display device according to the invention for converting electrical signals representative of data characters into a visual display includes a drum means having a plurality of light sources associated therewith. Each of the light sources has an output end and is adapted in response to electrical signals to generate a light signal at its output end. An array of light conducting members has one end arranged to define a display surface and the other end arranged to define a plurality of light input connections. Each of the light conducting members of the array is adapted to conduct a light signal at its input connection to the display surface.

The display device also includes means for producing relative motion between the drum means and the light input connection of the array of light conducting members to move the drum means with respect to the input connections of the array. Thus, the light signals from the plurality of light sources are coupled to the particular ones of the light conducting members that are adjacent to the light sources.

BRIEF DESCRIPTION OF THE DRAWINGS

The construction and operation of the invention will be more fully understood from the following detailed description taken in conjunction with the accompanying figures in which.

DETAILED DESCRIPTION OF THE INVENTION

Figure 1:
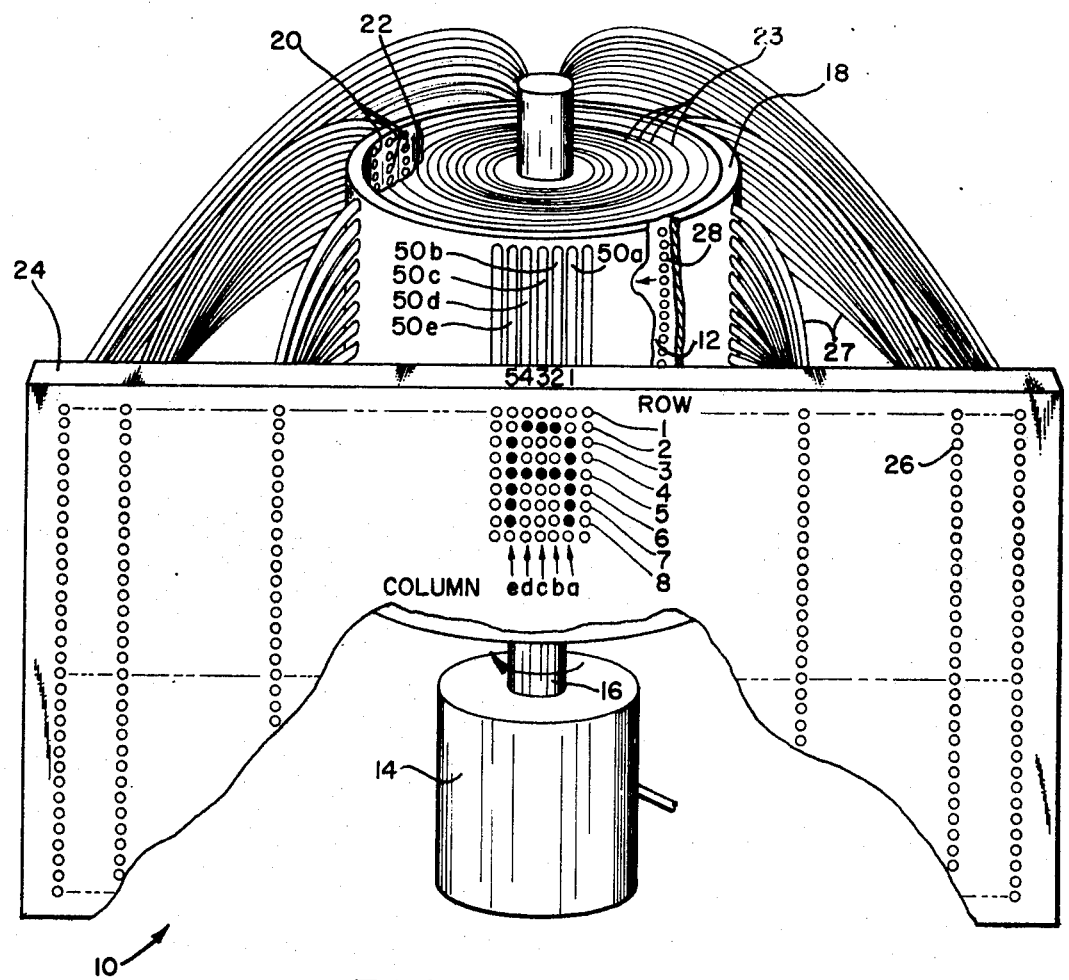
FIG. 1 is a schematic view in perspective of an embodiment of the display device according to the invention.

A display device 10 according to the present invention is shown in perspective in FIG. 1 and includes a drum 12 coupled to a motor 14 via a shaft 16. The drum 14 is rotatable, mounted within a cylinder 18 having a plurality of holes 20 located in the walls 22. The plurality of holes 20 are arranged, for example, in columns parallel to the axis of the drum 12. A plurality of concentric slip rings 23 are located on one end of the drum 12. A display plate 24 includes a matrix, for example, a 31 by 64 matrix, of holes 26 extending therethrough. Each of a plurality of light conducting members 27 is connected between a separate one of the holes 26 in the display plate 24 and a separate hole 20 in the cylinder 18 to provide a light path therebetween. The ends of the light conducting members 27 associated with the display plate 24 form the display surface of the display device 10.

Figure 2:
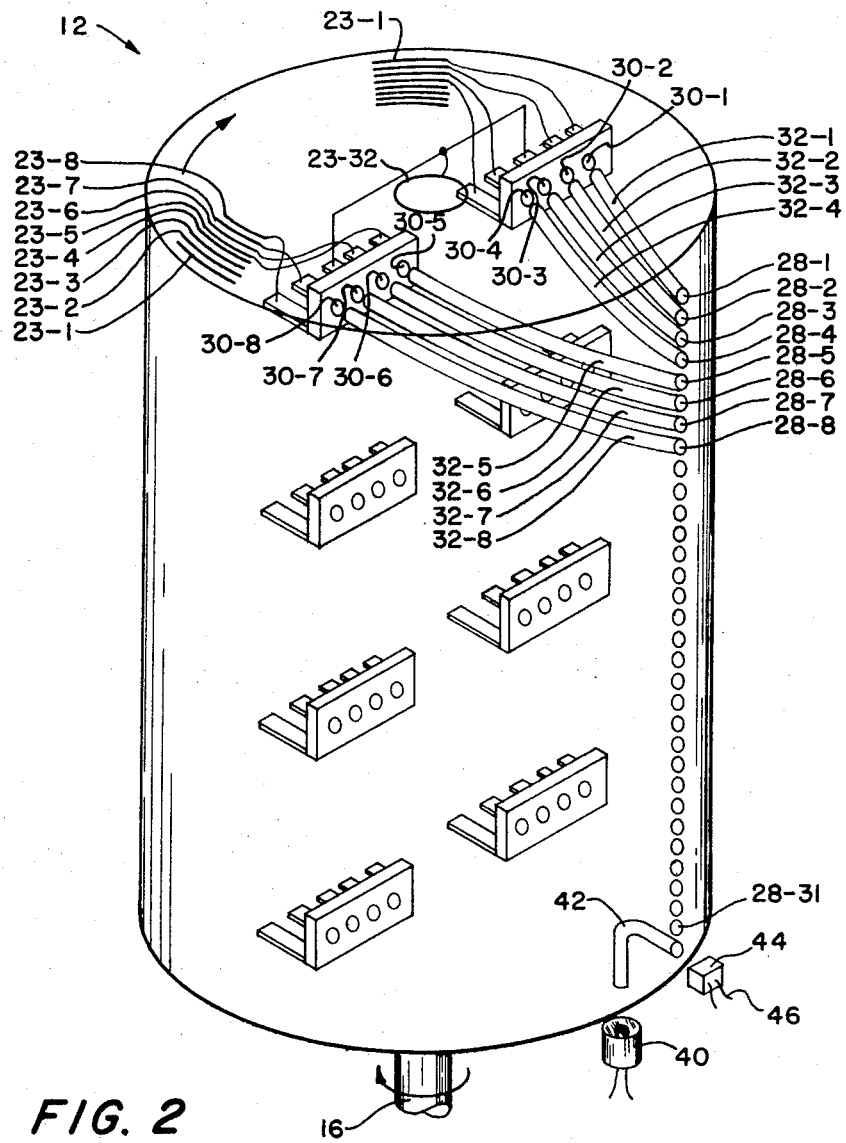
FIG. 2 is a schematic view in perspective of a drum employed in the embodiment of FIG. 1.

The drum 12, a schematic presentation of which is shown in perspective in FIG. 2, includes a plurality of light sources 28-1 through 28-31 which, for example, may be a combination of light emitting diodes (LED) coupled with fiber optic light conductors. For purposes of this application, only eight LED's 30-1 through 30-8 and eight fiber optic light conductors 32-1 through 32-8 are shown. However, it is to be understood that each of the light sources 28-1 through 28-31 has a corresponding combination of a LED and a fiber optic light conductor. The drum 12 also includes the slip rings 23, nine of which are shown in FIG. 2. One terminal, for example, the anode, of each LED 30-1 through 30-8 is connected to a respective slip ring 23-1 through 23-8 and the other terminal (the cathode) of each LED 30-1 through 30-8 is connected together and to a common slip ring 23-32.

To aid in synchronizing the drum rotation with associated electronics (not shown), the display system 10 also includes a means for generating a synchronization signal employing a light 40 mounted such that the drum 12 rotates with respect to it. A fiber optic light conducting element 42 is fixedly mounted on the drum 12 such that one end of the light conducting element 42 passes over the light 40 at least once for reach revolution of the drum 12. A light sensitive means, for example, a photo transistor 44, is also mounted to the cylindrical surface 18 such that the drum 12 makes at least one rotation with respect to it. When the drum 12 rotates to the position where the light conducting member 42 couples light from the light 40 to the photo transistor 44, an electrical signal (a synchronization signal) is generated at the wires 46. The electrical signal thus generated can be employed to synchronize the drum rotation with the electronic circuits that supply data signals to the slip rings.

Electrical signals representing, for example, alphanumeric characters may be supplied to the slip rings by any one of several techniques within the art. One technique employing a film and photoelectric devices is shown in U. S. Pat. No. 2,454,238. Another technique may include a memory drum (not shown) rotating on the same shaft 16 as the drum 12 and having a column of read/write heads equal to the number of light sources 28-1 through 28-31. The output connection of the read heads via the appropriate amplifiers are connected to the slip rings 23. As the drum 12 and the memory drum rotate, the appropriate signals are read from the memory drum and transferred via the slip rings to the appropriate LED's 30. It is to be understood that the apparatus for generating and applying the electrical signals to the slip rings 23 is not part of this invention.

In operation, an electrical signal applied, for example, to the slip ring 23-1 (FIG. 2) is connected via a wire to the anode of the light emitting diode 30-1 causing the diode to turn on. The resulting light is coupled through the fiber optic light conductor 32-1 to become the light source 28-1. Depending on the rotational position of drum 12, the light signal is coupled through the particular light conducting member 27 that has one end opposite the energized light source.

The operation of the display device 10 will be more fully explained in conjunction with slip ring signals (FIG. 3) and the corresponding drum positions as shown in FIG. 1. Assume the column of light sources 28 on the drum 13 have rotated to position 1 (FIG. 1)

such that the lights 28 are in line with the ends of the column of light conducting members 50a. While the drum 12 is in position 1, an electrical signal (FIG. 3) applied to each of the slip rings 23-3 through 23-8 is coupled to the cathode of the respective LED's 30-3 through 30-8. The electrical signals are converted to light signals by the action of the LED's and thereafter transmitted along the fiber optic light conductors 32-3 through =-8.

Figure 3:
FIG. 3 is a plurality of waveshapes used to explain the embodiment of FIG. 1.
Figure 3:
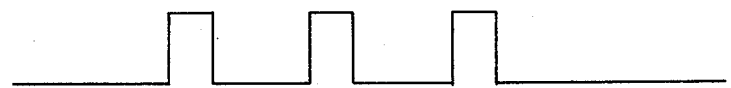
Figure 3:
Figure 3:
Figure 3:
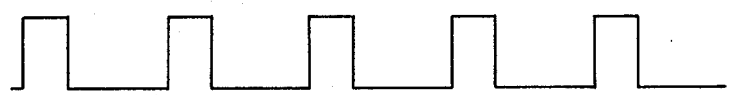
Figure 3:
Figure 3:
Figure 3:
Figure 3:
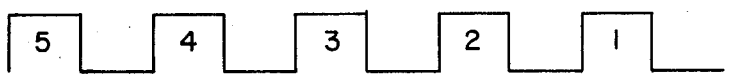

The light signals thus generated are coupled from the fiber optic light conductors 32-3 through 32-8 to respective light conducting members of column 50, the ends of which are designated as column "a" on the face of the display surface 24. Therefore, when the drum 12 is in position 1, the electric signals (as shown in FIG. 3) applied to the slip rings 23-3 through 23-8 are converted to the light signals of column a, rows 3 through 8. When the drum 12 is rotated to position 2, the slip rings 23-2 and 23-5 receive electrical signals which are converted (in the manner described above) to the light signals of column b, rows 2 and 5. Similarly, as the drum 12 rotates through positions 3, 4 and 5, the electrical signals applied to the slip rings 23-2 through 23-8 are converted to light signals at the display surface to generate the character "A."

It is to be appreciated that while the columns of light signals are sequentially generated, the rate of which they are generated must be in excess of the flicker fusion rate of the eye to appear as a continuous light. For example, if the motor 14 is rotating at the rate of 3,600 revolutions a minute (or 60 revolutions a second) and since the display surface is scanned by the column of light sources 28 once per revolution, the light signals forming a character appear at the rate of 60 times per second which is well above the flicker fusion frequency of the eye.

While there has been shown and described herein what is considered a preferred embodiment of a display system, it will be obvious to those skilled in the art that various changes and modifications may be made therein without departing from the invention. For example, while the slip rings are shown on one surface of the drum, they could be located radially on either the periphery of the drum 12 on one side of the column of light sources or on the shaft 16 with the LED connecting wires running in a hollowed center thereof. What is claimed is:

1. Display apparatus for converting electrical signals representative of data into a visual display, comprising:
    drum means;
    a plurality of individually energizable light sources associated with the drum means, each of the plurality of light sources having an output end and each of the plurality of light sources being adaptive in response to electrical signals to generate a light signal at its output end;
    energizing means associated with the drum means and coupled to the plurality of light sources, said energizing means being adapted to couple electrical signals selectively to the plurality of light sources whereby light sources of the plurality may selectively be energized to generate selectively light signals at the output ends thereof;
    a plurality of sets of light conducting members spaced along the circumference of the drum means, the number of light conducting members in each set being equal to the number of light sources, each of the sets of light conducting members having first ends remote from the drum means and arranged in a linear pattern, the first ends of the plurality of sets of light conducting members defining a display surface, and each of the plurality of sets of light conducting members having opposite ends proximate to the drum means and arranged to define input connections for receiving light signals produced at the output ends of the plurality of light sources, each of said light conducting
    members being operative to conducting light signals from the opposite end thereof to said display surface; and
    means for producing relative motion between the drum means and the opposite ends of the plurality of sets of light conducting members to cause the plurality of light sources to move past the opposite ends of the plurality of sets of light conducting members in succession, the opposite ends of only one of the sets of light conducting members being in light signal receiving relationship with the plurality of light sources at any given instant, whereby when electrical signals are selectively applied by the energizing means to the plurality of light sources as the light sources move past the opposite ends of the plurality of sets of light conducting members in succession, the light signals at the output ends of the light sources are received by the opposite ends of the plurality of sets of light conducting members in succession and conducted to the linearly arranged first ends thereof, a display thereby being built up progressively at the linearly arranged first ends of the plurality of sets of light conducting members.

2. Display apparatus according to claim 1 wherein the energizing means includes a plurality of slip rings associated with one surface of the drum means, each of the plurality of slip rings being electrically coupled to a separate one of the plurality of light sources and arranged to receive electrical signals selectively whereby the plurality of light sources may be selectively energized.

3. Display apparatus according to claim 2 wherein each of said plurality of light sources includes:
    a conversion device having an input connection coupled to a separate one of said slip rings and an output port and being adaptive in response to an electrical signal at its input connection to convert the electrical signal to a light signal at its output port; and
    light conducting means having one end coupled to the output port of said conversion device and the other end positioned on the periphery of said drum and being adapted to transmit a light signal from said one end to said other end.

4. Display apparatus according to claim 3 wherein said conversion device is a light emitting diode and said light conducting means is a length of fiber optic material.

5. Display apparatus according to claim 1 including a cylindrical member having an inside diameter greater than the diameter of said drum means to permit rotation of said drum means with respect thereto and having longitudinal columns of holes extending transversely through the walls thereof, one column of holes corresponding to each set of light-conducting members, said columns of holes being parallel to the axis of rotation of the drum means and adapted to receive the opposite ends of the plurality of sets of light conducting members.

6. Display apparatus according to claim 5 including a synchronizing means operative to indicate when said drum means has moved a predetermined distance with respect to said cylindrical member.

7. Display apparatus according to claim 6 wherein said synchronizing means includes:

a light conducting member fixedly mounted on said drum means and having a first end associated with a first surface of said drum means and a second end associated with a second surface of said drum means and being operative to transmit to its second end a light signal received at its first end;

a fixed light source positioned such that said one end of said light conducting member passes by said fixed light source and being operative to generate a light signal; and light sensing means positioned in light transmitting arrangement with the second end of said light conducting member and being operative in response to a light signal received via said light conducting member to generate an electrical signal indicating the light transmitting alignment of said fixed light source and said light conducting member.

* * * * *